(12) United States Patent
Nampo (10) Patent No.: US 10,583,667 B2
(45) Date of Patent: Mar. 10, 2020

(54) PRINTER

(71) Applicant: Brother Kogyo Kabushiki Kaisha, Nagoya-shi, Aichi-ken (JP)

(72) Inventor: Hiromichi Nampo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/235,431

(22) Filed: Dec. 28, 2018

(65) Prior Publication Data

US 2019/0240992 A1 Aug. 8, 2019

(30) Foreign Application Priority Data

Feb. 5, 2018 (JP) .................... 2018-018106

(51) Int. Cl.
| | |
|---|---|
| *B41J 2/375* | (2006.01) |
| *B41J 3/46* | (2006.01) |
| *B41J 29/38* | (2006.01) |
| *B41J 13/00* | (2006.01) |
| *B41J 3/44* | (2006.01) |
| *B41J 3/36* | (2006.01) |
| *G06F 3/12* | (2006.01) |
| *B41J 2/335* | (2006.01) |

(52) U.S. Cl.
CPC .............. *B41J 2/375* (2013.01); *B41J 3/36* (2013.01); *B41J 3/44* (2013.01); *B41J 3/46* (2013.01); *B41J 13/0027* (2013.01); *B41J 29/38* (2013.01); *B41J 2/3358* (2013.01); *G06F 3/1292* (2013.01)

(58) Field of Classification Search
CPC ....... B41J 2/375; B41J 3/36; B41J 3/44; B41J 13/0027; B41J 29/38; B41J 3/46; B41J 2/3358; G06F 3/1292; H04N 1/2346
USPC .......................................................... 347/194
See application file for complete search history.

(56) References Cited

U.S. PATENT DOCUMENTS

| | | | |
|---|---|---|---|
| 9,868,297 B2 | 1/2018 | Kako | |
| 2008/0152417 A1* | 6/2008 | Heaton | ....................... B41J 3/36 |
| | | | 400/693 |
| 2010/0315665 A1* | 12/2010 | Ebusui | ................... G06F 3/1213 |
| | | | 358/1.14 |
| 2016/0224285 A1* | 8/2016 | Jimbo | ................... G06F 3/1211 |
| 2016/0288557 A1 | 10/2016 | Kako | |

FOREIGN PATENT DOCUMENTS

JP 2016-190328 A 11/2016

* cited by examiner

*Primary Examiner* — Huan H Tran
*Assistant Examiner* — Alexander D Shenderov
(74) *Attorney, Agent, or Firm* — Banner & Witcoff, Ltd.

(57) ABSTRACT

The disclosure discloses a printer including a feeder, a printing, a communication device, and a controller. The controller is configured to execute a temperature reception process and a printing control process. In the temperature reception process, first temperature data is received. The first temperature data is broadcast-transmitted from at least one other printer and corresponds to a first temperature inside the other printer. In the printing control process, a feeder and a printing head are controlled on the basis of the first temperature data to form a print on a printing medium and thereby generate a printed matter.

8 Claims, 12 Drawing Sheets

PRINTER

CROSS-REFERENCE TO RELATED APPLICATION

The present application claims priority from Japanese Patent Application No. 2018-018106, which was filed on Feb. 5, 2018, the disclosure of which is incorporated herein by reference in its entirety.

BACKGROUND

Field

The present disclosure relates to a printer operated by using an operation terminal through wireless communication through a communication means to perform a print.

Description of the Related Art

A printer is known that includes a temperature sensor for detecting a temperature of a printing head as an environmental temperature inside a printer. This temperature sensor is included for detecting (monitoring) the temperature of the printing head and executing a cooling process in the case that the detected temperature becomes equal to or higher than a predetermined threshold value on the assumption that overheating of the printing head defined as an error event has occurred.

In the prior art described above, the temperature of the printing head is monitored as an environmental temperature inside a printer (hereinafter simply referred to as "apparatus internal temperature").

When a printed matter is produced by performing a print by a printing means on a fed print-receiving medium, the feeding resistance of the print-receiving medium fed in the apparatus varies depending on a medium temperature of the print-receiving medium, and the feeding resistance is small when the medium temperature is relatively high, while the feeding resistance is large when the medium temperature is relatively low. Therefore, control is generally carried out such that a feeding means has a smaller driving force when the detected apparatus internal temperature is higher while the feeding means has a larger driving force when the detected apparatus internal temperature is lower.

However, for some reason (e.g., in the case that a portable printer considerably cooled under an external environment is brought back into a room and used with a print-receiving medium at room temperature attached thereto, in the case that a print-receiving medium placed in a high-temperature warehouse for a long time is attached to and used with a printer at room temperature, or in the case that a print-receiving medium at a normal temperature is freshly attached and used in a situation where the temperature inside the apparatus is raised due to a long period of use), a significant difference may be generated between the apparatus internal temperature and the medium temperature. In such a case, for example, in the case the apparatus internal temperature is low while the medium temperature is high, the driving force becomes excessively larger, causing a problem that an excessively high feeding speed elongates printing contents. Conversely, for example, in the case that the apparatus internal temperature is high while the medium temperature is low, the driving force becomes excessively small, causing a problem that step-out of a stepping motor driving the feeding means tends to occur, for example.

SUMMARY

An object of the present disclosure to provide a printer capable of avoiding the problems and carrying out control of a feeding speed appropriate for a temperature of a print-receiving medium.

In order to achieve the above-described object, according to aspect of the present application, there is provided a printer comprising a feeder configured to feed a print-receiving medium, a printing head configured to perform a print on the print-receiving medium fed by the feeder, a communication device configured to perform wireless communication, and a controller, the controller being configured to execute a temperature reception process for receiving, through the communication device, first temperature data that is broadcast-transmitted from at least one other printer and corresponds to a first temperature inside the other printer, and a printing control process for controlling the feeder and the printing head on the basis of the first temperature data received in the temperature reception process to form a print on the printing medium and thereby generate a printed matter.

DETAILED DESCRIPTION OF THE PREFERRED EMBODIMENTS

An embodiment of the present disclosure will now be described with reference to the drawings. Constituent elements of the shown embodiment are appropriately scaled to facilitate understanding of the present disclosure.

<Printer>

Figure 1:
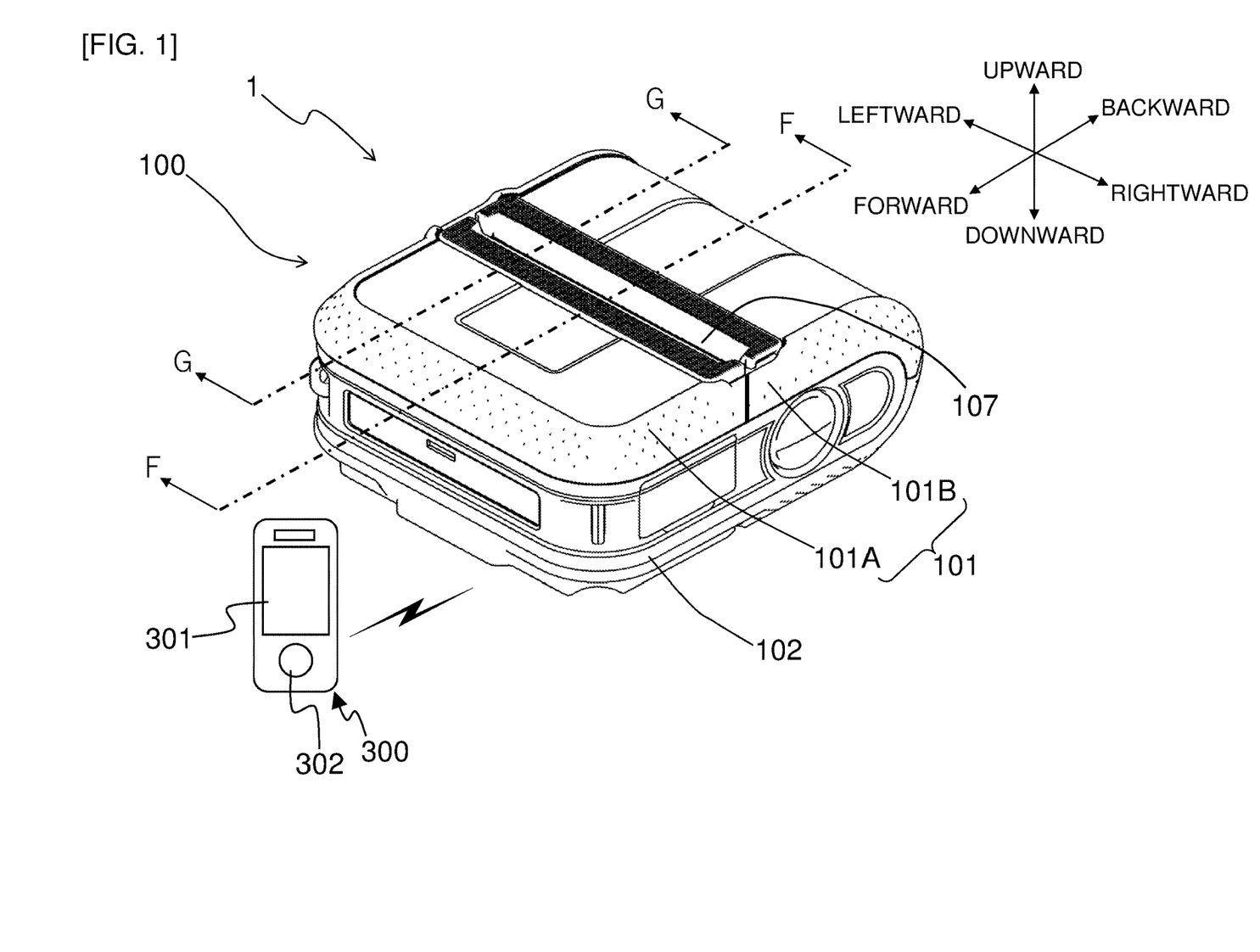
FIG. 1 is a perspective view showing a schematic configuration of a printer to which an embodiment of the present disclosure is applied.
Figure 2A:
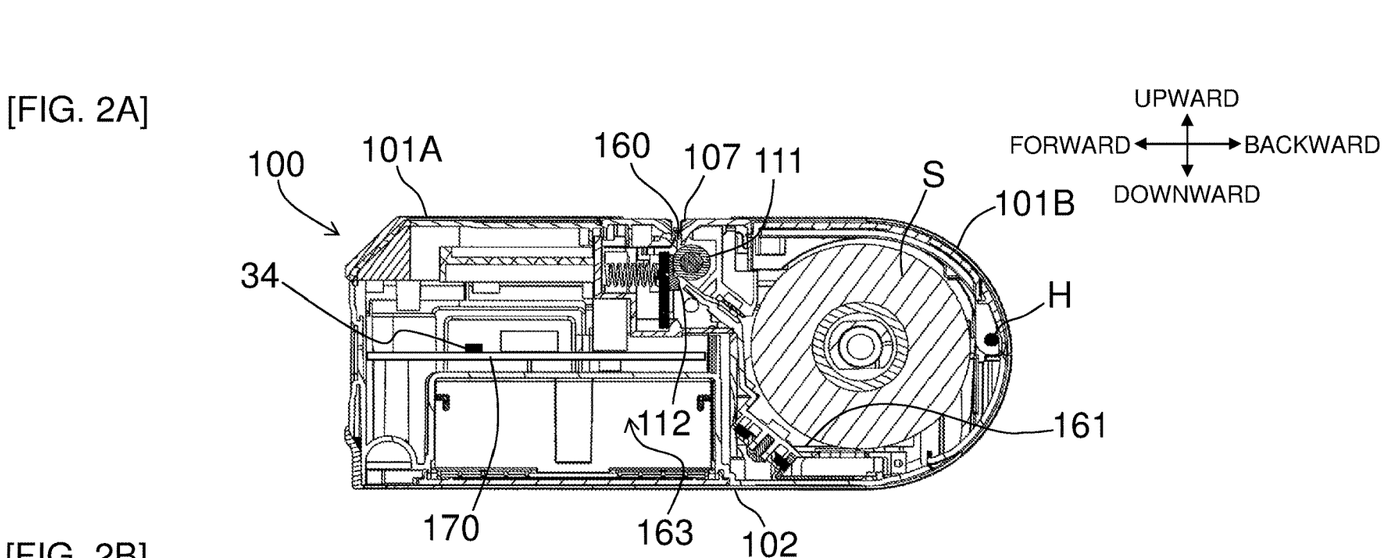
FIG. 2A is a cross-sectional view taken along a line F-F of FIG. 1.
Figure 2B:
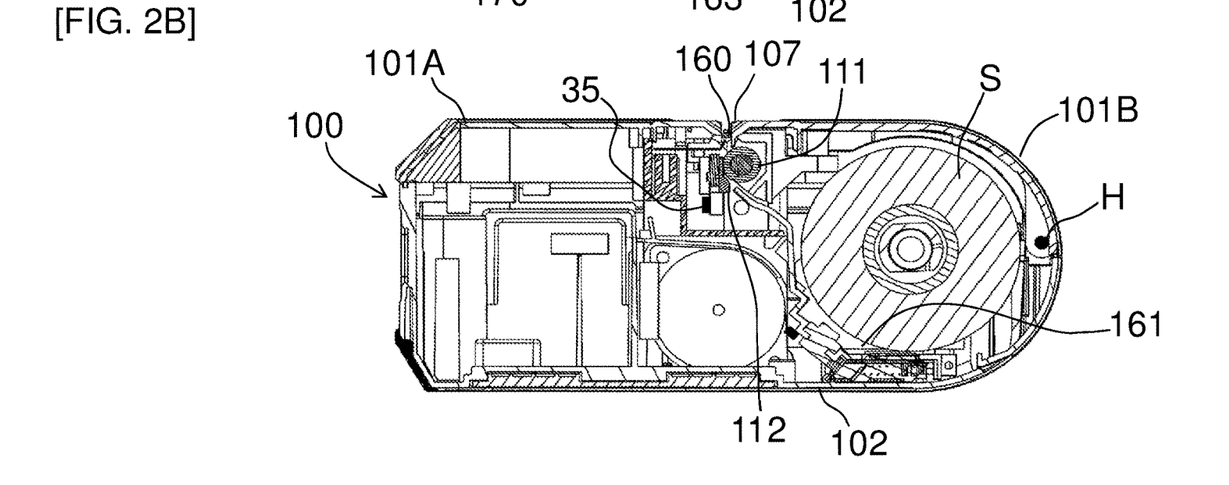
FIG. 2B is a cross-sectional view taken along a line G-G of FIG. 1.

A printer of this embodiment will be described with reference to FIGS. 1 and 2. In FIGS. 1 and 2, directions toward the lower right side, the upper left side, the upper right side, the lower left side, the upper side, and the lower side of FIG. 1 are defined as rightward, leftward, backward, forward, upward, and downward, respectively (see arrows shown in the figures.

In FIGS. 1 and 2, a printer 1 can be driven by using a rechargeable battery as a power source and executes printing corresponding to print data received from an external apparatus (not shown). The printer 1 can be network-connected through a built-in antenna serving as a communication means not shown to another printer (described in detail later) and an operation terminal 300 serving as an external apparatus by a well-known mutually recognizable wireless communication method (e.g., Bluetooth Low Energy (registered trademark)).

The printer 1 includes a substantially box-shaped housing 100 constituting an apparatus contour. This housing 100 includes a top cover 101 constituting an upper portion of the apparatus contour and a bottom cover 102 constituting a lower portion of the apparatus contour. The top cover 101 includes a fixing part 101A and an opening and closing lid 101B (corresponding to an opening and closing cover).

As shown in FIG. 2, a roll storage part 161 is disposed inside the housing 100 below an opening opened and closed by the open/close lid 101B of the top cover 101. In this roll storage part 161, roll paper S serving as an example of a print-receiving medium is stored with both end portions rotatably supported by support members (not shown), so that the roll paper S can continuously be supplied from the roll storage part 161. In this state, the opening and closing lid 101B is rotatably coupled to a rear end portion of the bottom cover 102 via a hinge part H, and when the opening and closing lid 101B is in an opened state, the roll storage part 161 is exposed to the outside of the apparatus so that the roll paper S can easily be mounted or replaced. A discharging exit 107 for discharging the roll paper S after print is disposed in a substantially central portion in the front-rear direction of the top cover 101.

A platen roller 111 serving as an example of a feeding means is rotatably supported in a front side end portion of the opening and closing lid 101B. The platen roller 111 feeds the roll paper S when the open/close lid 101B is in a closed state.

A desired print is formed on the roll paper S fed as described above by a thermal line head 112 serving as a printing means coming into contact with the platen roller 111 at a predetermined pressure contact force. A transport roller motor (see FIG. 5 described later) 32 generating a driving force for rotationally driving the platen roller 111 is disposed inside the housing 100, and in the closed state of the opening and closing lid 101B, the driving force of the transport roller motor 32 is transmitted by a gear mechanism not shown to the platen roller 111. The driving of the transport roller motor 32 is controlled by a control board 170 (see FIG. 2A) disposed inside the housing 100 toward the rear side.

Under the control board 170 inside the housing 100, a battery storage part 163 (see FIG. 2A) is included such that the above described battery is inserted and disposed therein from the lower surface side of the bottom cover 102. Although not shown, the above described battery is horizontally stored in the battery storage part 163 from the viewpoint of stability and centroid location. The control board 170 controls the thermal line head 112, the transport roller motor 32, etc. while using electric power supplied from the battery stored in the battery storage part 163. In this example, a lithium ion battery is included as the battery. As shown in FIG. 2A, the control board 170 comprises a board temperature sensor 34 such as a thermistor for detecting (monitoring) the temperature of the control board 170. In the vicinity of the thermal line head 112, as shown in FIG. 2B, a head temperature sensor 35 such as a thermistor for detecting (monitoring) the temperature of the thermal line head 112 is disposed. The board temperature sensor 34 and the head temperature sensor 35 correspond to a detecting means described in claims.

<General Operation of Printer>

In the above described configuration, at the time of printing, print data is transmitted from the external apparatus (the operation terminal 300) to the printer 1 through wireless communication (or wired communication or infrared communication). The roll paper S is fed out from the roll storage part 161 due to the rotation of the platen roller 111 on the basis of the driving force of the transport roller motor 32. The fed-out roll paper S is inserted between the thermal line head 112 (corresponding to the printing means) and the platen roller 111, and the thermal line head 112 performs printing in a desired form onto the roll paper S on the basis of the above described print data. The roll paper S after printing (corresponding to a printed matter) is discharged from the discharging exit 107 to the outside of the housing 100. In this regard, a fixed blade 160 is attached to a main chassis member 150 along the discharging exit 107 inside the discharging exit 107. A user can manually cut an end portion of the roll paper S discharged from the discharging exit 107 after completion of printing as described above by using the fixed blade 160.

The operation terminal 300 is, for example, a personal digital assistance (hereinafter also abbreviated as "PDA") having a wireless communication function or a smartphone (a mobile phone terminal having a PDA function). The operation terminal 300 has, for example, a liquid crystal display 301 and an operation button 302. The liquid crystal display 301 has a display function of displaying various pieces of information and messages and enables a user to input desired instructions and information by using a touch panel method etc. in combination with the operation button 302. Therefore, hereinafter, the display function of the liquid crystal display 301 is referred to as a "display part 301", and an operational function of a touch panel and an operational function of the operation button 302 are collectively simply referred to as an "operation part 302".

The printer(s) 1 and the operation terminal 300 can perform broadcasting (hereinafter also simply referred to as "BC" and the same applies to the drawings) for transmitting data to all apparatuses capable of participating in the network using the same wireless communication method.

Figure 3:
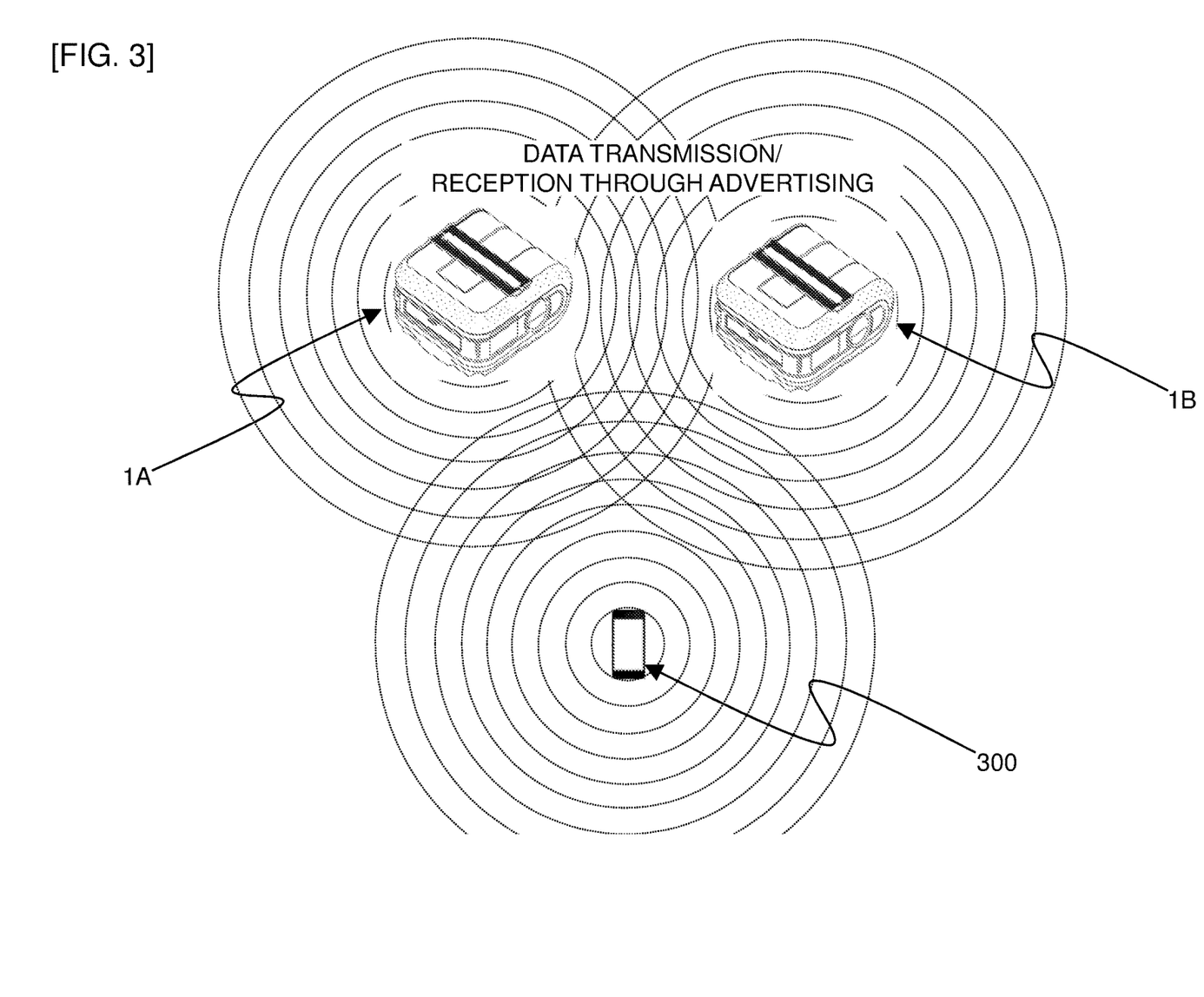
FIG. 3 is an explanatory view showing a relationship of a state of mutual communication through advertising.
Figure 4A:
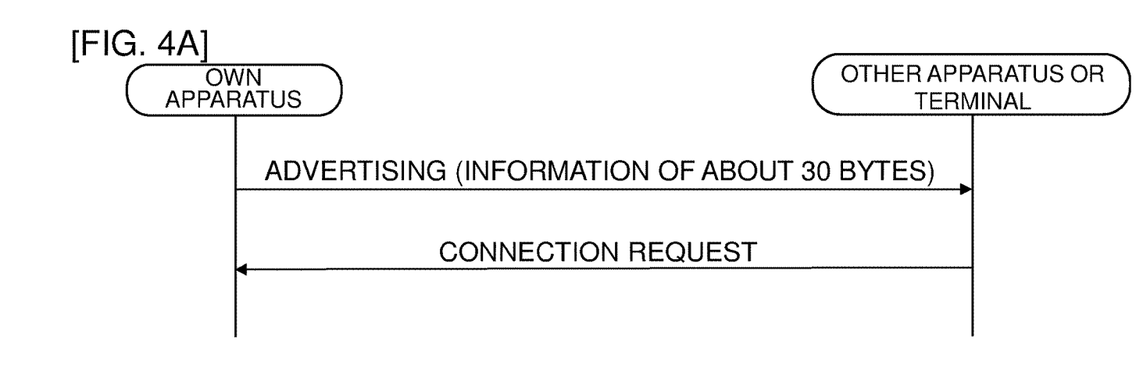
FIG. 4A is a sequence diagram of processes showing a data transmission/reception relationship between an own apparatus and another apparatus or a terminal.
Figure 4B:
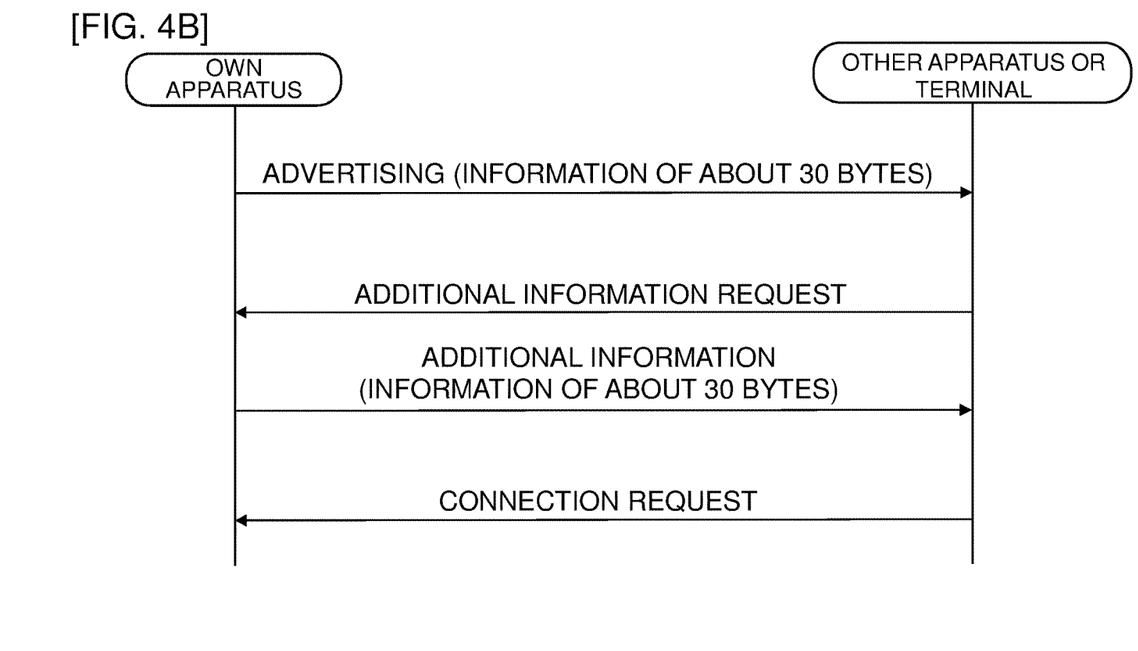
FIG. 4B is a sequence diagram of processes showing a data transmission/reception relationship between an own apparatus and another apparatus or a terminal.

As a result, as shown in FIG. 3, for example, the multiple printers 1 (in this example, two printers 1A, 1B) can implement advertising for periodically transmitting information necessary for network management (hereinafter also referred to as "network management information") between an own apparatus and another apparatus and between the own apparatus and the operation terminal 300. Details of this advertising will be described with reference to FIGS. 4A and 4B. For example, in this embodiment, as shown in FIG. 4A, the printer 1A serving as the own apparatus performs advertising of network management information of about 30 bytes to the printer 1B serving as the other apparatus and waits for a connection request from the printer 1B serving as the other apparatus. Alternatively, as shown in FIG. 4B, the printer 1A serving as the own apparatus performs advertising of network management information of about 30 bytes to the printer 1B serving as the other apparatus, receives an additional connection request from the printer 1B serving as the other apparatus that has not been connected to the network until now, performs advertising of network management information of about 30 bytes from the printer 1A serving as the own apparatus to the printer 1B serving as the other apparatus, and waits for a connection request from the printer 1B serving as the other apparatus. The network management information of about 30 bytes includes the temperature data described above etc. The above described network management information includes at least one of temperature detection results from the board temperature sensor 34 and the head temperature sensor 35 of each of the multiple printers 1.

Additionally, the operation terminal 300 can receive the data broadcast-transmitted from the printer(s) 1 to recognize and associate the connectable printers 1.

<Functional Configurations of Printer 1 and Operation Terminal 300>

Functional configurations of the printer 1 and the operation terminal 300 will be described with reference to FIG. 5.

Figure 5:
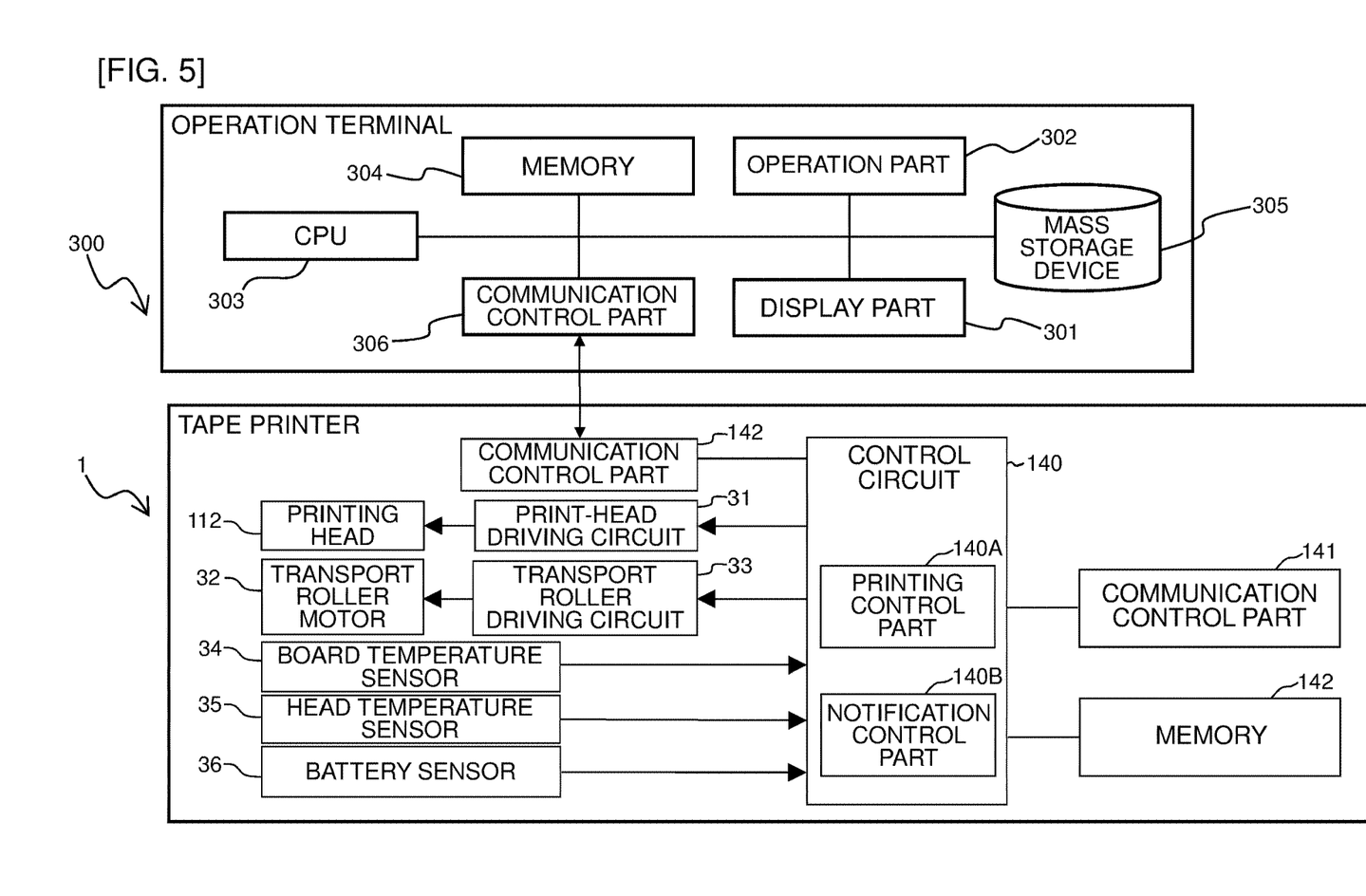
FIG. 5 is a block diagram showing a functional configuration of a printer and an operation terminal.

In FIG. 5, the printer 1 includes a print-head driving circuit 31 controlling and causing the thermal line head 112 to perform a print operation of desired print contents for the roll paper S, the transport roller motor (hereinafter also simply referred to as a "motor") 32 driving the platen roller 26, a transport roller driving circuit 33 controlling the transport roller motor 32, the above described board temperature sensor 34 and the above described head temperature sensor 35 for detecting (monitoring) temperatures of the control board 170 and the thermal line head 112 and respectively outputting corresponding temperature data to detect occurrence of an error such as high-temperature anomaly, a battery sensor 36 detecting a battery remaining amount, a control circuit 140 (corresponding to a control means) controlling an overall operation of the printer 1 via the print-head driving circuit 31, the transport roller driving circuit 35, etc., a communication control part 141 performing a mutually-recognized communication including connection authentication through a known technique with the operation terminal 300, and a memory 142 consisting of a RAM and a ROM, for example. The above described ROM of the memory 142 stores a printing processing program for executing procedures (processes) of a flow of FIG. 6 etc. described later. Additionally, the memory 142 stores, as network management information related to the printer 1, information of printing speed, resolution, etc. as well as performance level information such as a high performance different between an upper model and lower model etc.

The multiple printers 1 each have the above described temperature data in the memory 142. Therefore, for example, when the multiple printers 1 include one of the printers 1 as an "own apparatus" and the other printer 1 as an "other apparatus", the above described temperature data of the other apparatus is "first temperature data" with respect to the own apparatus, and the above described temperature data in the own apparatus corresponds to "second temperature data". As a result, the control circuit 140 of the own apparatus can execute a printing control process for determining whether or not any other printer 1 has a temperature control condition for the roll paper S serving as the print-receiving medium, the temperature control condition being better than that of the printer 1 that is the own apparatus (described in detail later). In the following description, the first temperature data is also simply referred to as "first temperature" or "other apparatus temperature", and the second temperature data is also simply referred to as "second temperature" or "own apparatus temperature".

The control circuit 140 displays on the display part 301 a user interface (hereinafter also simply abbreviated as "UI") menu for allowing a user to visually recognize and select multiple functions, setting items, etc. The display of the UI menu can include which temperature data is used in each of the printers 1 to control the printer (own apparatus) 1, or which printer 1 has optimum temperature data (which printer 1 is recommended).

The communication control part 141 includes constituent elements necessary for wireless communication such as an antenna and constitutes a communication means. The communication control part 141 performs the mutually-recognized communication including connection authentication through a known technique with the operation terminal 300 and also performs the mutually-recognized communications with the other printers 1 (e.g., printers 1B, 1C, 1X).

The control circuit 140 includes a printing control part 140A for carrying out controls of printing in a regular printing mode and printing in a continuous printing mode, and a notification control part 140B for controlling transmission of various notifications (described later) to the operation terminal 300.

The operation terminal 300 includes a CPU 303, a memory 304 consisting of, for example, a RAM and a ROM, the operation part 302, the display part 301, a mass storage device 305 consisting of a hard disk device etc. and storing various pieces of information, and a communication control part 306 controlling transmission/reception of information to/from the at least one of the printer 1 through the mutually-recognized communication.

The CPU 303 executes a signal process in accordance with a program stored in advance in the ROM while using a temporary storage function of the RAM, thereby transmitting/receiving various instruction and information signals to/from the printer 1.

In this embodiment of the above described configuration, as described above, the printer 1 is the printer 1 including the platen roller 111 feeding the roll paper S, the thermal line head 112 performing print on the roll paper S fed by the platen roller 111, the communication means performing wireless communication, and the control circuit 140, and the control circuit 140 is characterized by executing: a temperature reception process of receiving the first temperature data (other apparatus temperature data) broadcast-transmitted from at least one of the other printers 1 serving as the other apparatus through the communication control part 141 as the temperature data inside the at least one of the other printers 1; and a printing control process of controlling he platen roller 111 and the thermal line head 112 based on the first temperature data received in the temperature reception process to form a print on the roll paper S and thereby generate a printed matter. The details will be described with reference to FIG. 6.

In the following description, the printer 1 is simply referred to as "PRINTER", and the broadcast is simply referred to as "BC", as appropriate in the drawings.

Figure 6:
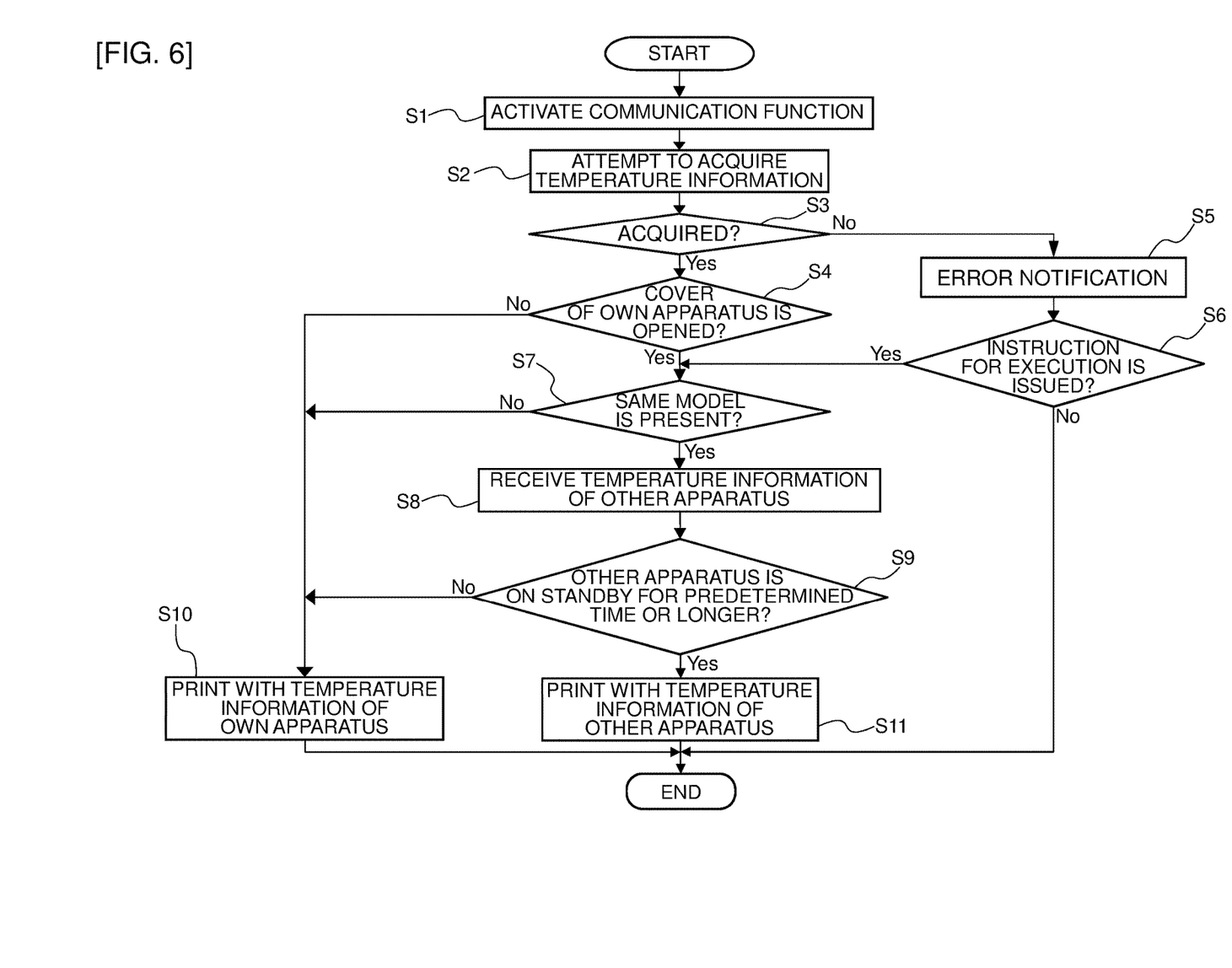
FIG. 6 is a flowchart showing a process executed by a control circuit of a label producing apparatus.

FIG. 6 is a flowchart showing a control routine executed by the control circuit 140 of each of the printers 1. In the following description, it is assumed that the multiple printers 1 are present in a network area receivable for the operating terminal 300, and any one of the printers 1 is defined as the own apparatus (the printer 1A in examples shown in the figures) while the printers 1 different from the own apparatus are defined as other apparatuses (the printers 1B-1C, 1X in the examples shown in the figures).

At step S1, in the case that a connection request for printing (or pairing) is made from the operation terminal 300, the control circuit 140 of the own apparatus (e.g., the above described printer 1A) activates the communication function and shifts the process to step S2.

At step S2, the control circuit 140 of the own apparatus attempts to acquire detected temperature data (hereinafter simply referred to as "temperature information") as a current apparatus internal temperature from at least one of the board temperature sensor 34 and the head temperature sensor 35 and shifts the process to step S3.

At step S3, the control circuit 140 of the own apparatus executes an acquisition determination process of determining whether or not the temperature information is successfully acquired at step S2 from at least one of the board temperature sensor 34 and the head temperature sensor 35. In the case that the above described temperature information of the own apparatus serving as the second temperature data is determined as being successfully acquired (Yes), the control circuit 140 of the own apparatus stores the acquired temperature information in the memory 142 and shifts the process to step S4. On the other hand, in the case that the temperature information of the own apparatus is not determined as being successfully acquired (No), the control circuit 140 of the own apparatus shifts the process to step S5.

At step S5, for example, an error signal is output to the operation terminal 300 to cause the display unit 301 of the operation terminal 300 to make an error notification as UI information. Subsequently, at step S6, the control circuit 140 of the own apparatus determines whether or not an instruction signal for forcible execution etc. is included in the print data output and acquired from the operation terminal 300 after the above described connection request. In the case that the above described instruction signal for forced execution etc. is determined as being included (Yes), the control circuit 140 of the own apparatus shifts the process to step S7. On the other hand, in the case that the instruction signal for forcible execution etc. is not determined as being included in the print data output from the operation terminal 300 (No), this flow is terminated.

at step S4, the control circuit 140 of the own apparatus determines whether or not the top cover 101 (specifically, the opening and closing lid 101B) is opened, on the basis of a detection result of a known open/close sensor, for example Specifically, in the case that the opening and closing lid 101B is opened, the roll paper S is highly possibly replaced, so that a difference is highly possibly generated between the apparatus internal temperature (=estimated temperature of the roll paper S) on the basis of the temperature detected by the sensors 34 and the actual temperature of the roll paper S. Therefore, in the case that the opening and closing lid 101B is not determined as being opened (No), the control circuit 140 of the own apparatus shifts the process to step S10 and performs a print on the basis of the temperature information stored in the memory 140 of the own apparatus. On the other hand, in the case that the opening and closing lid 101 B is determined as being opened (Yes), the control circuit 140 of the own apparatus shifts the process to step S7.

At step S7, the control circuit 140 of the own apparatus determines whether or not a printer of the same model as the own apparatus is present among the other apparatuses (the printers 1B-1C, 1X of the figures) present in the network area. Specifically, in the case that the other apparatus is of the same model as the own apparatus, the same/similar temperature environment is particularly likely to occur due to equivalence of internal structures etc. Therefore, when determining whether or not to utilize temperature information in the relationship between the own apparatus and the other apparatus, the control circuit 140 of the own apparatus compares the temperature information only in the case that the printer 1 (e.g., the above described printer 1B) of the same model as the own apparatus is present. In the case that the printer of the same model as the own apparatus is determined as being present (Yes), the control circuit 140 of the own apparatus shifts the process to step S8. On the other hand, in the case that the printer of the same model as the own apparatus is not determined as being present (No), the control circuit 140 of the own apparatus shifts the process to step S10 and performs a print on the basis of the temperature information stored in the memory 140 of the own apparatus.

At step S8, the control circuit 140 of the own apparatus executes the temperature reception process of receiving the temperature information of the other apparatus as the first temperature data through the advertising described above and shifts the process to step S9.

At step S9, the control circuit 140 of the own apparatus determines whether or not an idling time of the other printer 1 related to the temperature information (hereinafter also referred to as "first temperature") of the other apparatus acquired in step S8 is equal to or greater than a threshold value.

In the case that the idling time of the other printer 1 is determined as being equal to or greater than the threshold value at step 9 (Yes), the control circuit 140 of the own apparatus shifts the process to step S11 to control the platen roller 111 and the thermal line head 112 on the basis of the first temperature (other apparatus temperature). On the other hand, in the case that the idling time of the other printer 1 is not determined as being equal to or greater than the threshold value (No), the control circuit 140 of the own apparatus shifts the process to step S10 to control the platen roller 111 and the thermal line head 112 to step S10 on the basis of the second temperature (own apparatus temperature). Upon completion of step S10 or step S11, this flow is terminated. The process executed at step S10 and step S11 corresponds to a printing control process described in claims.

As described above, in this embodiment, in the above described temperature reception process (step 8), the temperature data (first temperature data) inside the apparatus broadcast-transmitted from at least one other apparatus is received through the above described communication control part 141. In the printing control process (step S10 and step S11), printing onto the roll paper S is performed on the basis of the received first temperature data. Therefore, even in the case that a difference is possibly generated between the apparatus internal temperature of the own apparatus and the temperature of the roll paper S as described above, the problems described above are suppressed or avoided by acquiring and using the apparatus inside temperature of the other apparatus originally placed in a room temperature environment, for example.

Particularly, the control circuit 140 of the own apparatus executes the printing control process for whether to perform the print by using the temperature information of the own apparatus (step S10) or perform the print by using the temperature information of the other apparatus (step S11), after estimating the temperature of the print-receiving medium (roll paper S) by the existing sensor.

For example, it is assumed that the user brings back the portable or mobile-type printer 1 from a cold outdoor location into a room and attempts to perform printing after freshly replacing the roll paper S of the printer 1 with new roll paper. In this case, the roll paper S newly mounted in the printer 1 is presumed as being stored in the warm room and therefore has a relatively high temperature. On the other hand, since the printer 1 is still considerably cooled due to the influence of the low temperature environment of the outdoor location, the temperature detected by the temperature sensors 34, 35 is low. Therefore, the printer 1 misunderstands that "the roll paper S is also at a low temperature" and attempts to feed the roll paper S with a large force since a lower temperature makes the roll paper S harder and the feeding resistance larger. This may cause inconveniences that the feeding speed becomes too fast (as compared to a preliminarily expected speed) and that printed characters are "elongated" in a transport direction. In this embodiment, such inconveniences are solved by the technique described above.

Particularly in this embodiment, in the case that the other printer 1 related to the first temperature is of the same model as the printer 1 in the above described printing control process (see step 7), the platen roller 111 and the thermal line head 112 are controlled on the basis of the first temperature data.

For example, in the case that the other apparatus is of the same model as the own apparatus, the same/similar temperature environment is particularly likely to occur due to equivalence of internal structures etc. Therefore, in this embodiment, when the own apparatus and the other apparatus are of the same model, the platen roller 111 and the thermal line head 112 are controlled by using the internal temperature of the other apparatus.

When the idling time of the other printer 1 related to the first temperature is equal to or greater than the threshold value in the above described printing control process (see step 9), the control circuit 140 of the own apparatus controls the platen roller 111 and the thermal line head 112 on the basis of the above described first temperature data.

Specifically, in general, when the printing operation is performed for a longer time, the internal temperature of the printer 1 rises to a high temperature, and when the idling time without performing the printing operation becomes longer, the internal temperature comes closer to an ambient temperature, or in other words, a medium temperature. Therefore, in this embodiment, when the idling time of the other apparatus is equal to or greater than a certain level, the platen roller 111 and the thermal line head 112 are controlled by using the internal temperature of the other apparatus (see step S11). As a result, more accurate control is carried out.

For example, in the acquisition determination process of step S3, even if the apparatus internal temperature cannot be detected due to some kind of system error including sensor failure etc., the routine of step S7 and subsequent steps is executed to acquire and substitute the apparatus internal temperature of the other apparatus so that an appropriate control is carried out for the platen roller 111 and the thermal line head 112.

Additionally, by executing the subsequent routine on condition that the opening and closing lid 101B is opened, a contribution can be made to simplification of a temperature management routine. As a result, at the timing at which the above described difference is likely to occur, the problems due to the difference are reliably prevented.

In the above example, the behaviors of the printers 1A, 1B have been described in accordance with the example in which the printer 1A and the printer 1B are the own apparatus and the other apparatus, respectively; however, from the viewpoint of the printer 1, at step 8, the control circuit 140 of the above described printer 1B executes a temperature transmission process of transmitting the temperature data related thereto (the second temperature data related to the own apparatus) through the communication control part 142 to the printer 1A regarded as the other apparatus.

The present disclosure is not limited to the above described embodiment and can variously be modified without departing from the spirit and the technical ideas thereof. Such modification examples will hereinafter be described in order.

Figure 7:
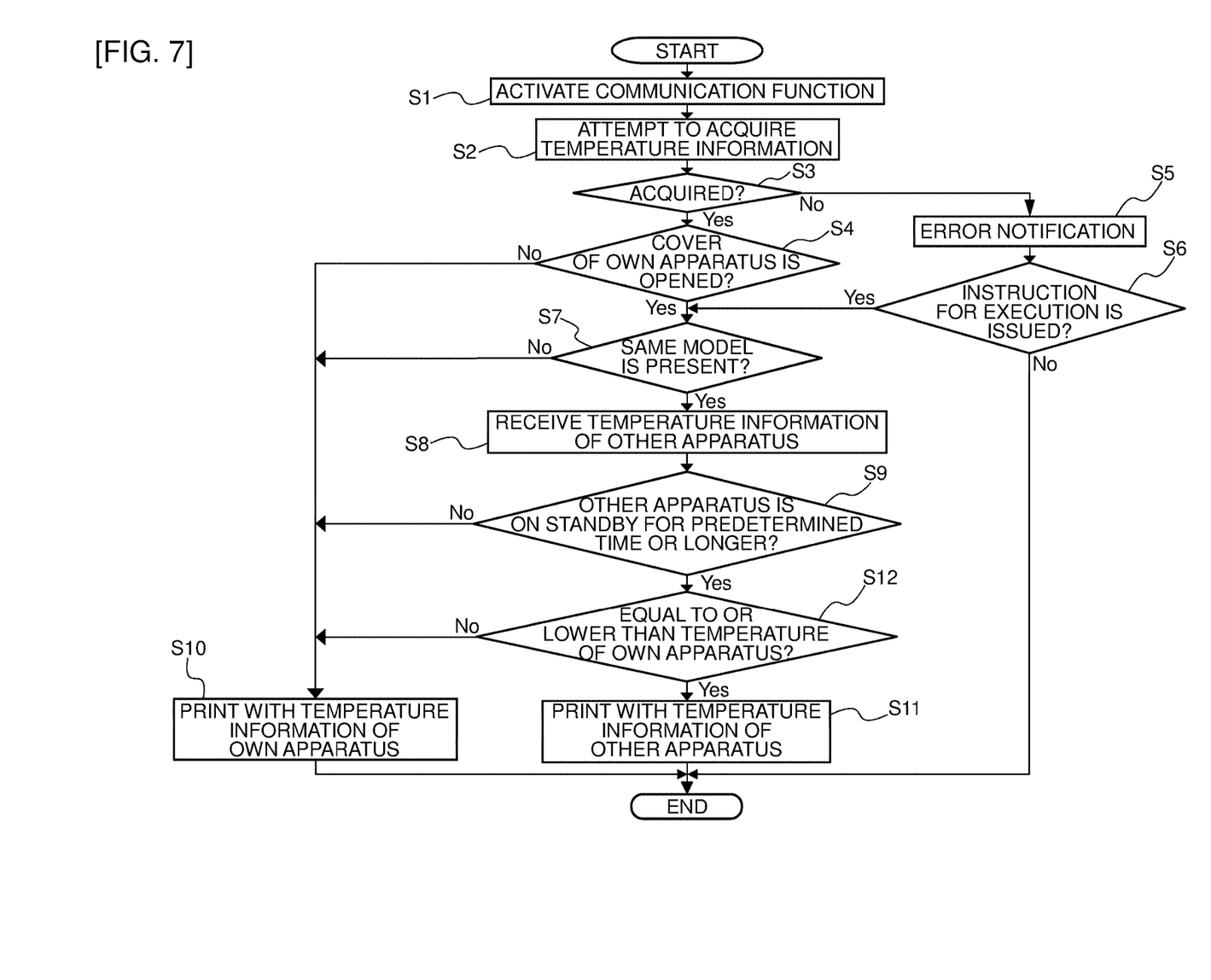
FIG. 7 is a flowchart showing a process executed by the control circuit of the label producing apparatus in a modification example in which the temperature of the own apparatus is compared with the temperature of the other apparatus.

(1) In the Case that Own Apparatus Temperature is Compared with Other Apparatus Temperature Specifically, for example, as shown in FIG. 7, in the case of the affirmative determination (Yes) at step 9, the control circuit 140 of the own apparatus may further add a determination condition at step 12.

At step 12, the control circuit 140 of the own apparatus compares the temperature information (first temperature data) of the other apparatus received in the temperature reception process of step 8 with the temperature information of the own apparatus stored in the memory 142 to determine whether or not the detected temperature of the temperature information of the other apparatus is lower. In the case that the detected temperature of the temperature information of the other apparatus is determined as being lower (Yes), the control circuit 140 of the own apparatus performs the print at the other apparatus temperature (step 11), and in the case that the detected temperature of the temperature information of the other apparatus is not determined as being lower (No), the control circuit 140 of the own apparatus performs the print at the own apparatus temperature (step S10). This has the following meaning.

For example, it is assumed that the printer is continuously used for several tens of minutes in a room that is relatively cool (that is not hot). In this case, the roll paper S in the printer 1 is at room temperature (relatively low temperature). On the other hand, as the printing operation continues, the printer 1 steadily becomes hotter due to the heat of the thermal head, and the temperature detected by each of the temperature sensors 34, 35 also becomes higher.

Therefore, the printer 1 misunderstands that "the roll paper S is also at high temperature" and attempts to reduce the driving force since a lower temperature makes the roll paper S softer and the feeding resistance smaller. As a result, the driving force becomes insufficient for the unexpectedly hard roll paper S, and in the case that a pulse motor is used as the transport roller motor 32, "step-out" of the pulse motor may occur. The "step-out" mainly means that smooth motor operation becomes difficult due to loss of matching between input of a pulse signal and switching of an excitation phase.

Therefore, in this modified example, the second temperature inside the printer 1 (own apparatus temperature. specifically, the board temperature or the head temperature) is detected by the board temperature sensor 34 or the head temperature sensor 35, and at step S12, the above described first temperature of the other apparatus is compared with the above described second temperature of the own apparatus, and if the first temperature is lower than the second temperature, the platen roller 111 and the thermal line head 112 are controlled on the basis of the above described first temperature of the other apparatus.

As a result, for example, in the case that the roll paper S at a normal temperature is freshly attached and used in the situation where the temperature inside the own apparatus is raised due to a long period of use, the control is carried out based on the above described first temperature from the other apparatus, which is close to the above described normal temperature. Therefore, the step-out of the stepping motor described above can reliably be prevented from occurring in the own apparatus.

(2) In the Case that Broadcast Transmission is Terminated in Accordance with Temperature Adopted at the Time of Printing This modification will be described with reference to FIGS. 8 to 12. In the following example, description will be made of the case that the operation terminal 300 displays on UI which one is used out of the temperature data of the printers 1A, 1B, 1C.

Figure 8:
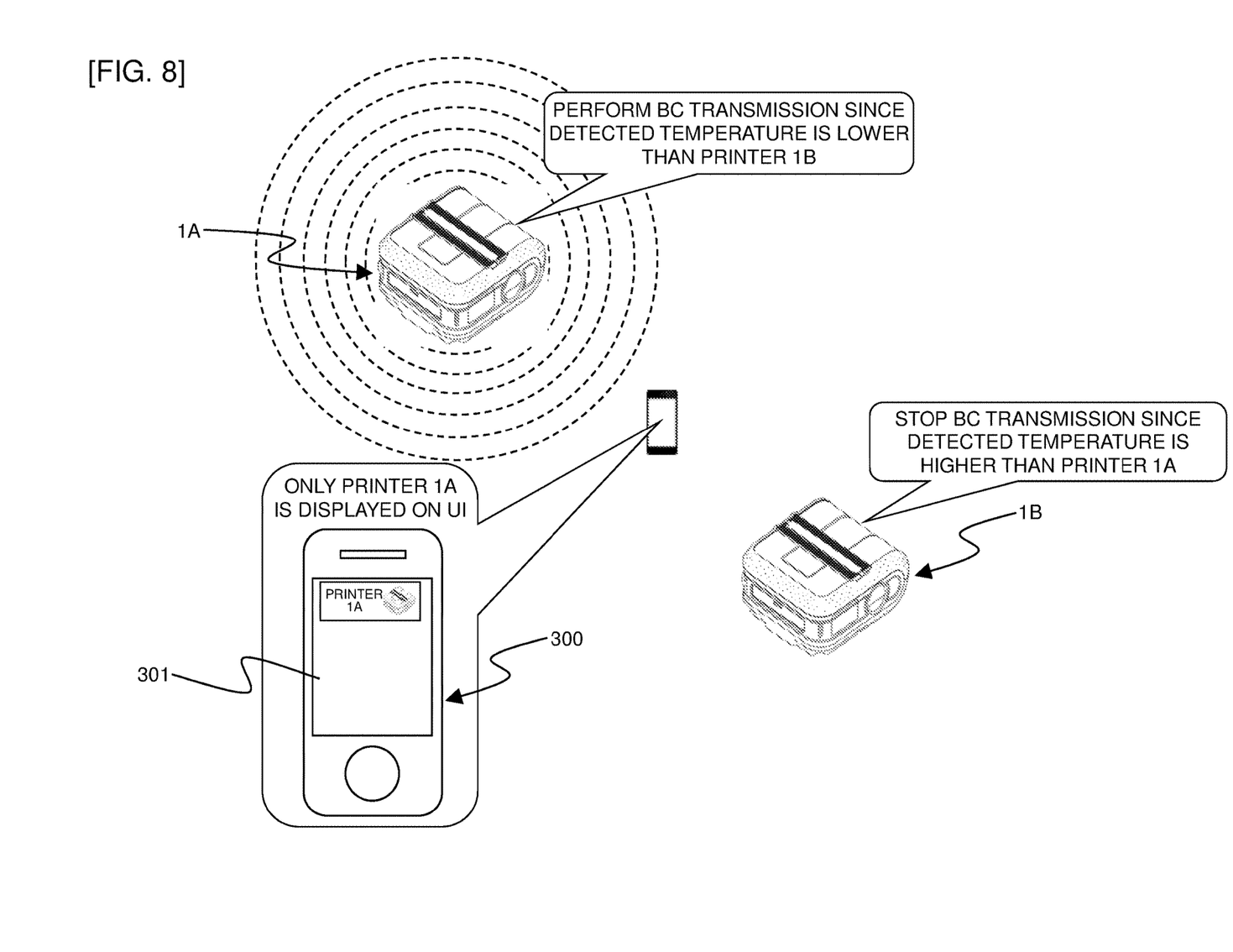
FIG. 8 is an explanatory view showing a behavior in the case that one of two printers executes a printing process by using temperature data of the other printer.

For example, in the example shown in FIG. 8, with the technique described in the above described (1), the temperature data of the printer 1A from the above described broadcasting between the printers 1A, 1B indicates a lower temperature, and the printer 1B executes a printing process by using the temperature data of the printer 1A. In this case, the above described broadcasting is stopped by the printer 1B having the temperature data that is not adopted at the time of printing. As a result, the operation terminal 300, displays only the printer 1A without displaying the printer 1B.

Figure 9:
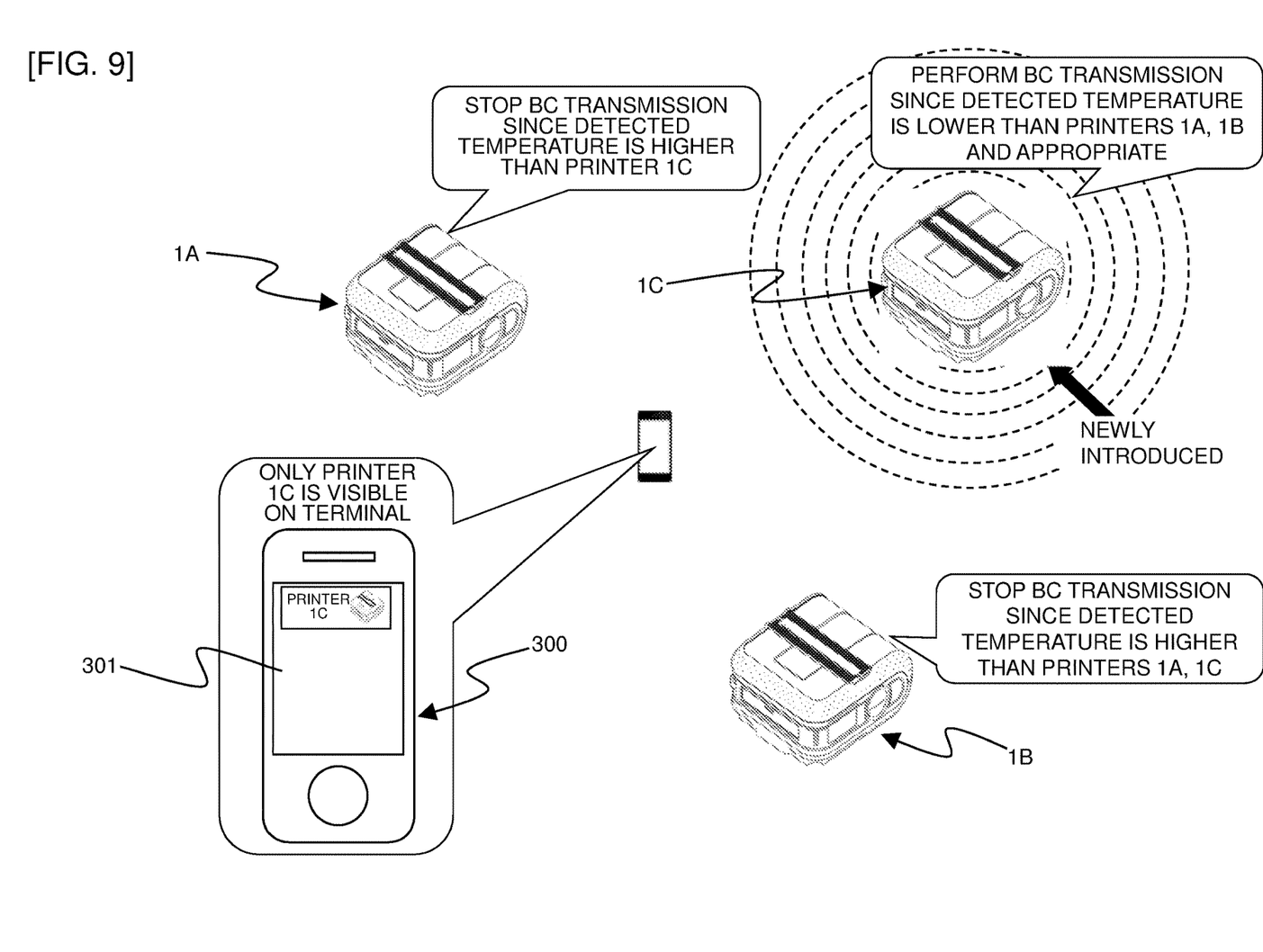
FIG. 9 is an explanatory view showing a behavior when a printer is newly added while two printers are present.

For example, in the example shown in FIG. 9, when two printers 1 (1A, 1B) of the same model are originally present as shown in FIG. 8, a new printer 1 (1C) of the same model is added into the network area.

In this case, in the case that the temperature data of the newly added printer 1C is acquired through broadcasting by the printer 1A and indicates a temperature lower than the temperature data of the printer 1A (in other words, a temperature lower than those of the two printers 1A, 1B), for example, the printer 1A performs the print by using the temperature information of the new printer 1C as the first temperature data. At this point, the printers 1A, 1B stop the above described broadcasting due to the presence of the above described printer 1C having the temperature data superior to the own apparatus. In this case, the operation terminal 300 displays only the printer 1C.

Figure 10:
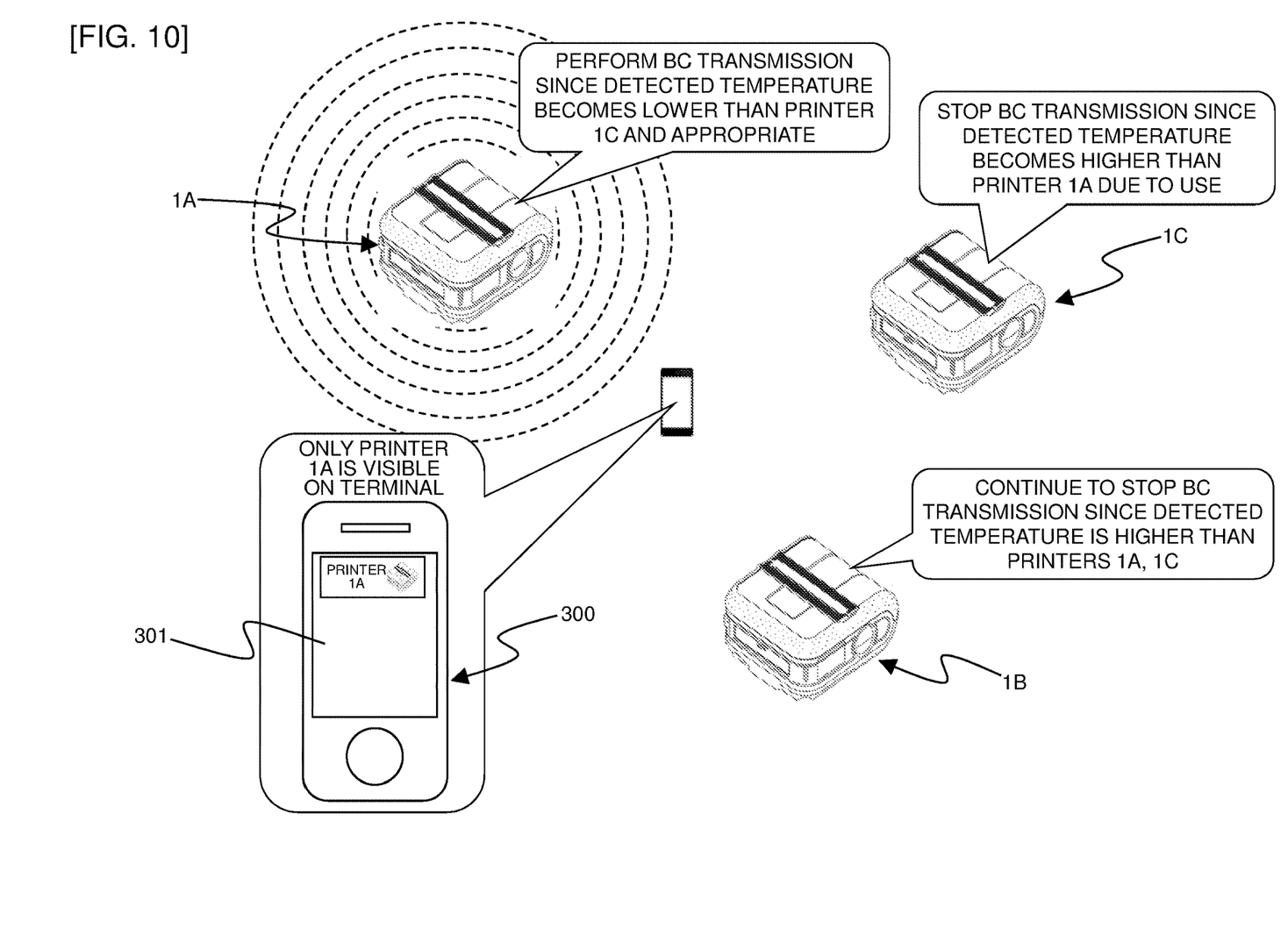
FIG. 10 is an explanatory view showing a behavior when the temperature data changes due to use of the printer from the state of FIG. 9.

In the case that the temperature data then shifts to the high temperature side due to use of the printer 1C from the state shown in FIG. 9 and the temperature indicated by the temperature data of the printer 1A becomes lower, as shown in FIG. 10, the printer 1C stops the broadcasting. In this case, the operation terminal 300 displays only the printer 1A.

Figure 11:
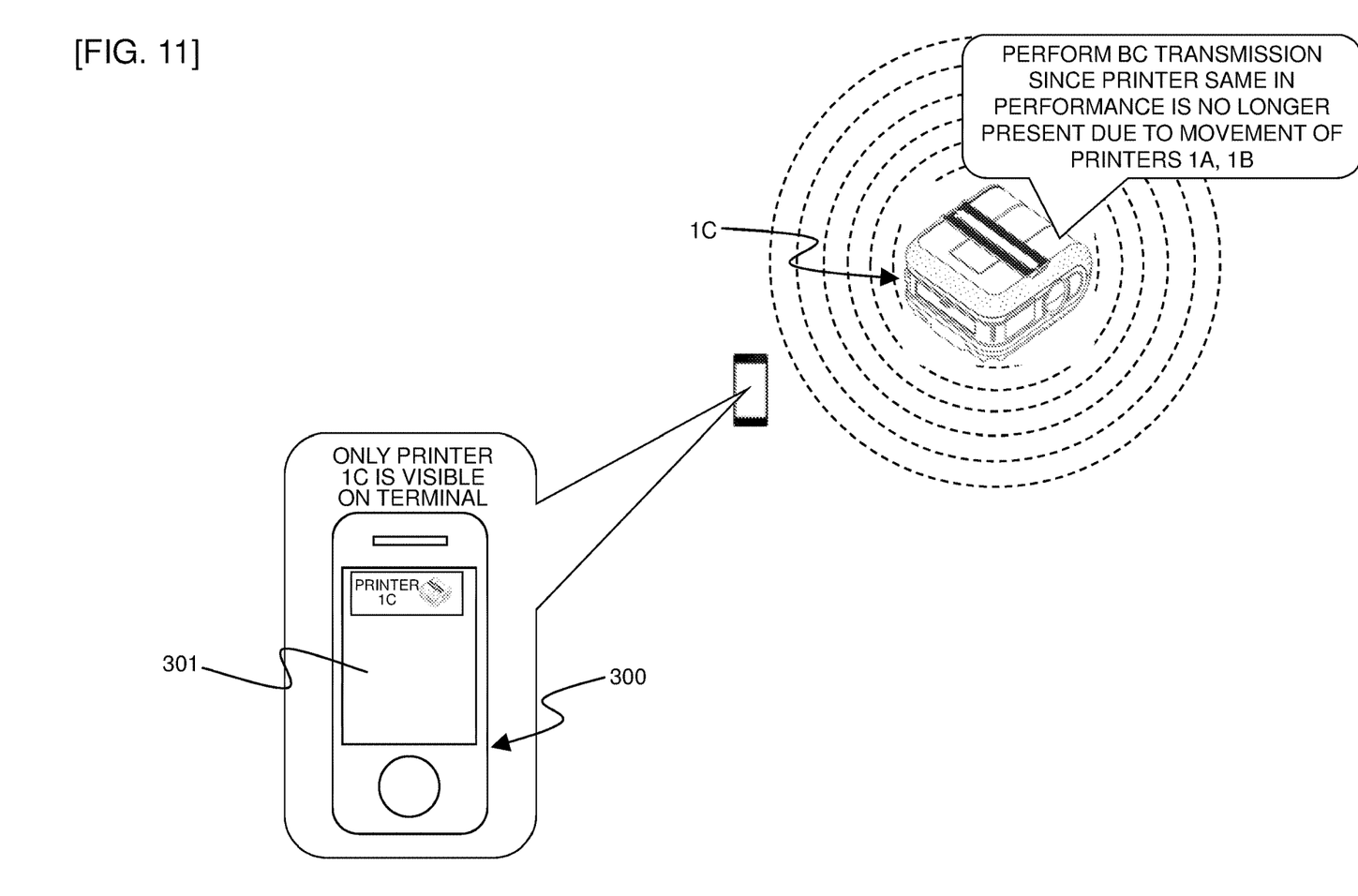
FIG. 11 is an explanatory view showing a behavior in the case that some printers are moved from the state of FIG. 10.
Figure 12:
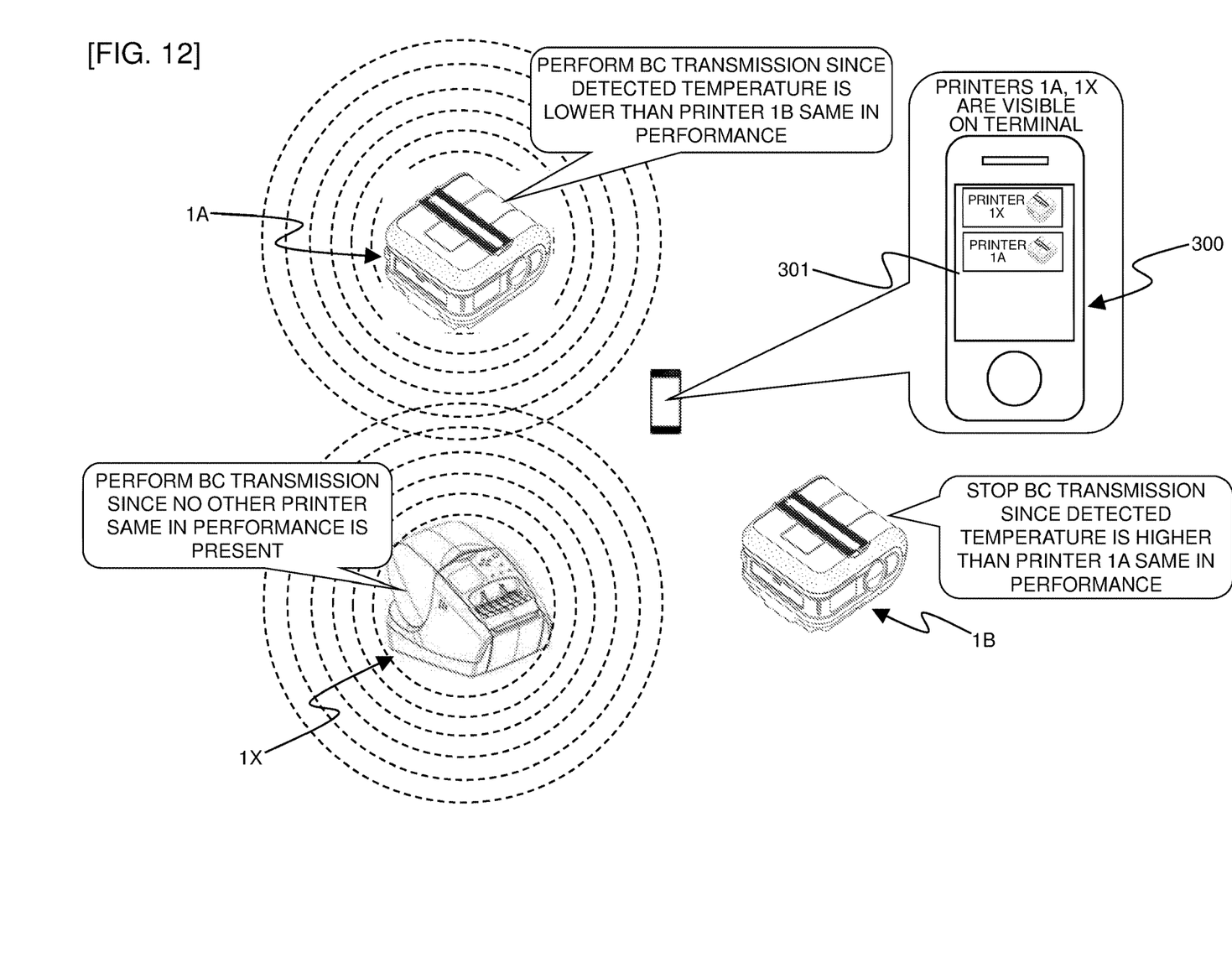
FIG. 12 is an explanatory diagram showing a behavior in the case that different models of printers are mixed.

FIG. 11 shows the case that the printers 1A, 1B are moved from the state shown in FIG. 10 and no longer present on the network. In this case, the printer 1C restarts broadcasting, and the operation terminal 300 displays only the printer 1C.

In the case that the printers 1 of different models are present, only the apparatuses of the same model may be compared in terms of the superiority of the temperature data. For example, in an example shown in FIG. 12, since the temperature data of the printer 1A is lower in comparison between the printers 1A, 1B of the same model, only the printer 1A performs broadcasting, and the printer 1B stops broadcasting. On the other hand, the printer 1X of another model performs broadcasting since no other printer of the same model is present. As a result, the operation terminal 300 displays only the printer 1A and the printer 1B. Instead of displaying both the printers 1A, 1X in this way, the user may be allowed to select through UI display which one is used out of the temperature data of the printers 1A, 1X of different models. In this case, for example, in the case that the printer 1X is functionally higher than the printers 1A, 1B in terms of a temperature-related function (e.g., a larger capacity inside the housing, a smaller number of heat-generating components, and the presence of a heat radiating component), the temperature data of the printer 1X may preferentially be used.

What is claimed is:

1. A printer comprising:
    a feeder configured to feed a print-receiving medium;
    a printing head configured to perform a print on said print-receiving medium fed by said feeder;
    a communication device configured to perform wireless communication; and
    a controller,
    said controller being configured to execute:
    a temperature reception process for receiving, through said communication device, first temperature data that is broadcast-transmitted from at least one other printer and corresponds to a first temperature inside the other printer, and
    a printing control process for controlling said feeder and said printing head on the basis of said first temperature data received in said temperature reception process to form a print on said print-receiving medium and thereby generate a printed matter.

2. The printer according to claim 1, wherein
    said controller is configured to further execute a model determination process for determining whether or not a model of said other printer related to said first temperature is the same as said printer, and wherein
    in said printing control process, said feeder and said printing head are controlled on the basis of said first temperature data in the case that the model of said other printer is determined as the same as said printer in said model determination process.

3. The printer according to claim 1, wherein
    said controller is configured to further execute an idling determination process for determining whether or not an idling time of said other printer related to said first temperature is equal to or greater than a threshold value, wherein
    in said printing control process, said feeder and said printing head are controlled on the basis of said first temperature data in the case that said idling time is determined as being equal to or greater than the threshold value in said idling determination process.

4. The printer according to claim 1, further comprising a detector configured to detect a second temperature inside said printer, wherein
    said controller is configured to further execute a comparison process for comparing second temperature data corresponding to said second temperature with said first temperature data, and wherein
    in said printing control process, said feeder and said printing head are controlled on the basis of said first temperature data in the case that said first temperature is lower than said second temperature as a result of a comparison in said comparison process.

5. The printer according to claim 1, further comprising a detector configured to detect a second temperature inside said printer, wherein
    said controller is configured to further execute an acquisition determination process for determining whether or not second temperature data corresponding to said second temperature is normally acquired, and wherein
    in said printing control process, said feeder and said printing head are controlled on the basis of said first temperature data in the case that said second temperature data is determined as not being normally acquired in said acquisition determination process.

6. The printer according to claim 4, wherein said controller is configured to further execute a temperature transmission process for transmitting said second temperature data to another printer through said communication device.

7. The printer according to claim 5, wherein said controller is configured to further execute a temperature transmission process for transmitting said second temperature data to another printer through said communication device.

8. The printer according to claim 1, comprising
a housing that constitutes an apparatus contour, and
an opening and closing cover configured to open and close an opening portion disposed in said housing, wherein
said controller is configured to further execute an opening and closing determination process for determining whether or not said opening and closing cover is opened, and wherein
said controller is configured to further execute said temperature reception process that is triggered by a determination that said opening and closing cover is opened in said opening and closing determination process.

* * * * *